United States Patent Office 2,855,290
Patented Oct. 7, 1958

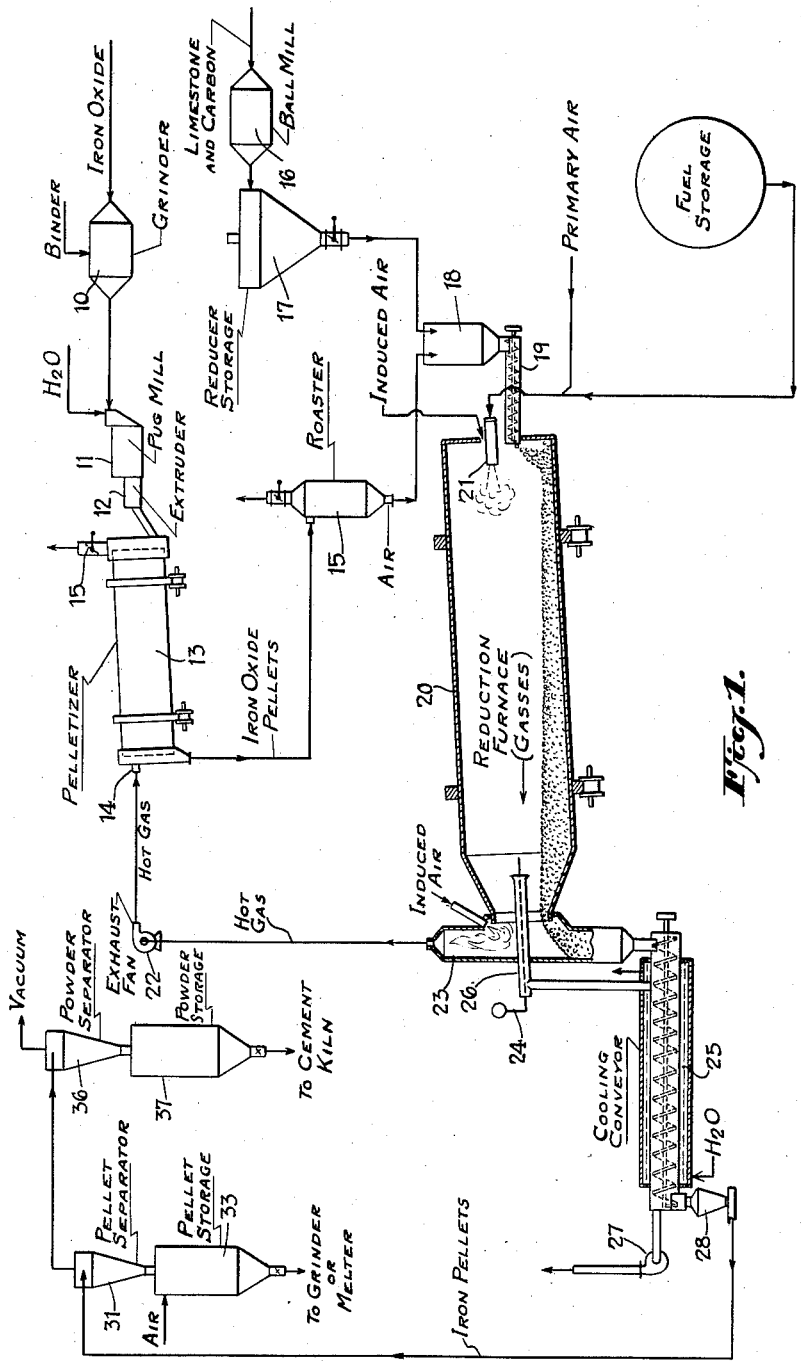

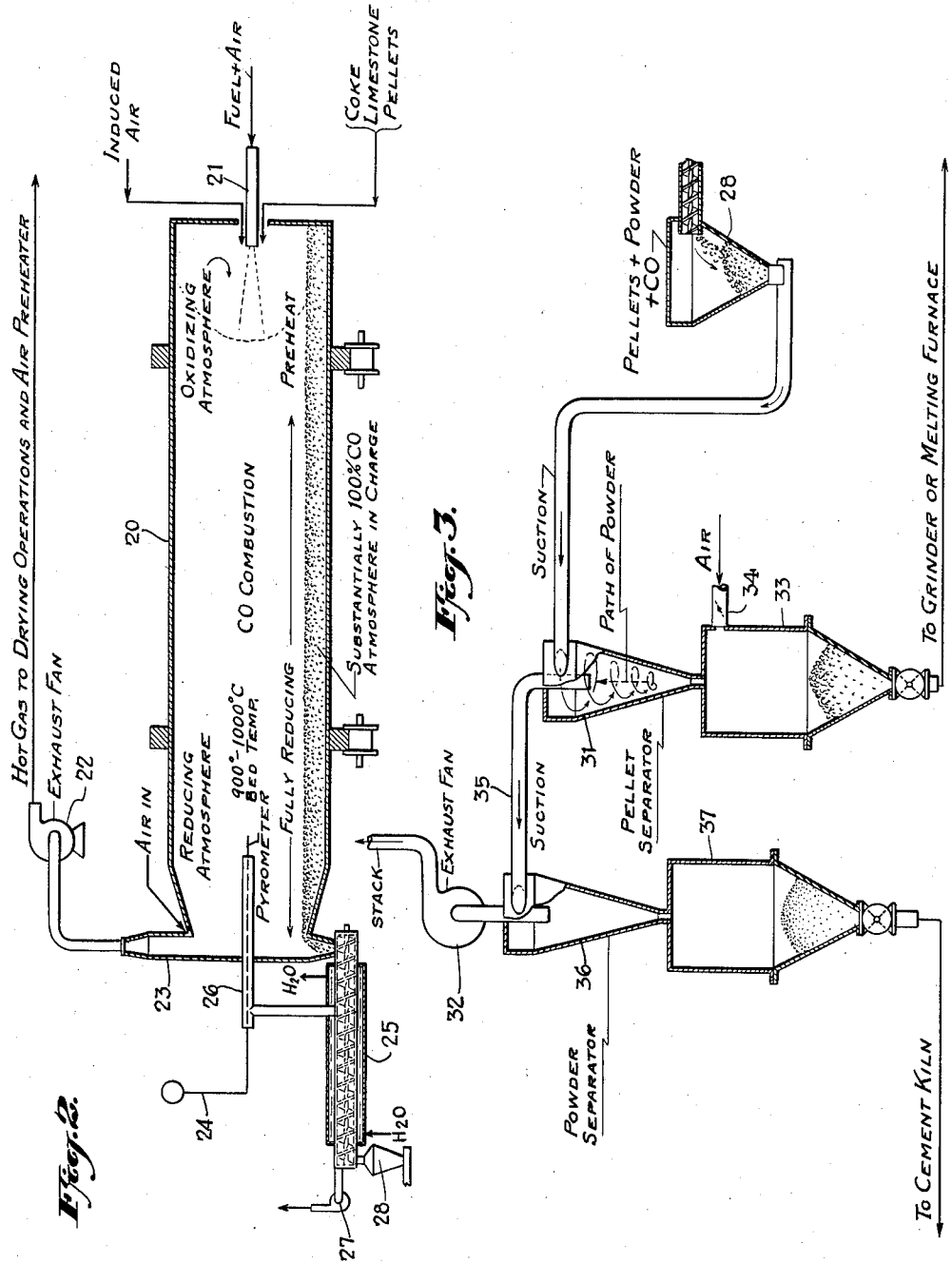

2,855,290

METHOD OF REDUCING IRON OXIDE TO SPONGE IRON

Horace Freeman, Cap-de-la-Madeleine, Quebec, Canada, assignor to Freeman Corporation, Cap-de-la-Madeleine, Quebec, Canada, a corporation of Canada Application July 12, 1956, Serial No. 597,507

Claims priority, application Canada April 4, 1956

11 Claims. (Cl. 75—33)

This invention relates to a process for directly reducing metal oxides, especially the oxides of iron, cobalt, nickel and copper to the sponge metal state. More particularly, the invention relates to reduction of iron oxide pellets to sponge iron by the action of carbon monoxide. In another aspect, the present invention relates to the production of a lime-containing powder simultaneously with the production of sponge metal, which when separated from the iron is suitable for use in the manufacture of cement. In order to simplify its description, the process will be described herein as applied to iron oxide and the production of sponge iron, however, it is to be understood that the process is likewise effective to reduce the oxides of copper, cobalt and nickel.

Heretofore, efforts to continuously and directly reduce iron oxide to sponge iron or the like in rotary kilns or other reduction furnaces have involved the countercurrent flow of hot gases which frequently causes sintering of the already hot reduced iron causing the same to lump and stick to the sides of the furnace at its discharge end. Previous furnace operations, and particularly the blast furnace which is a sponge iron producer, have involved excessive expenses for fuel, and the resulting product contains appreciable amounts of oxide, ash and carbon which is employed to produce the reducing agent carbon monoxide. In addition, the blast furnace requires a hard, expensive, low sulfur coke to the extent of nearly one ton (requiring about two tons of coal) for each ton of iron produced with the aid of about half a ton of limestone. The main shortcoming of the blast furnace lies in its thermal inefficiency, often less than 50 percent, which is derived from the fact that the reducing agent, carbon monoxide, is present in concentrations of only about 25 percent by volume. At this low concentration it must diffuse into and out of large lumps of ore, necessitating a period of reduction to sponge iron in the upper part of the furnace of approximately eight hours.

The present invention, on the other hand, provides a method of overcoming the above enumerated difficulties encountered in blast furnace operations, a method which is more economical, and one which provides a high concentration of carbon monoxide in intimate contact with the oxide pellets. The present process makes possible the direct and complete reduction of iron oxide to sponge iron which may contain less than 0.03 percent carbon.

In my copending U. S. patent application Serial No. 422,187, filed April 9, 1954, now U. S. Patent 2,792,298, of which the present application is a continuation-in-part, I described a method of reducing iron oxide pellets to sponge iron by feeding such pellets together with finely divided carbon of a nature such that its ash does not fuse or sinter at the reaction temperature of 1900°–2100° F. into a rotary kiln or other suitable furnace together with a limited quantity of air sufficient to oxidize the carbon to carbon monoxide, which in turn reduces the iron. In that process, excess carbon is employed over that required in order to convert the carbon dioxide formed during reduction of the iron oxide to carbon monoxide, thus maintaining a reducing atmosphere with respect to the hot iron pellets. While the present invention departs from the teachings of my earlier application in many respects, the principle difference resides in the use of considerably less carbon, carbon monoxide being produced by the action of carbon upon carbon dioxide produced by the decomposition of limestone.

Briefly, the present invention involves first grinding the iron oxide to a powder and then forming the same into small, hard, porous pellets, which are preferably then roasted in air to remove sulfur and further harden the pellets. The pellets are fed to a rotary kiln along with a finely divided reducing agent comprising a solid carbonaceous material and limestone or calcium carbonate. The carbonaceous material is desirably such that its ash does not fuse or sinter at the reaction temperature in the kiln or furnace. However, this is not essential since calcium carbonate is present in amounts sufficient to raise the fusion point of the ash so that it is several hundred degrees above the temperature within the furnace. Air is admitted to the charging end of the kiln where there is located a fuel oil or gas flame which raises the temperature of the charge to about 900°–1000° C., at which temperature the finely divided limestone therein decomposes forming calcium oxide and carbon dioxide. The carbon dioxide in the presence of hot carbon is rapidly reduced to carbon monoxide, thus providing a very high monoxide concentration within the charge in intimate contact with the iron oxide pellets, which reduces them to metallic iron. The charge together with the atmosphere above it are advanced co-currently through the kiln, the former through inclination and rotation of the kiln and the latter by induced draft. The calcium oxide thus produced substantially completely absorbs sulfur present in the carbonaceous material. The sponge iron in pellet form issuing from the discharge end of the furnace is suitably cooled in an atmosphere which is non-oxidizing with respect to the hot iron. The pellets are readily separated from the finely divided lime, ash, and any excess solid carbonaceous material present by screening, by magnetic separation, or by a novel air separation described hereinafter. The finely divided material is suitable for calcining to cement, in some instances without the addition of other material, and the present invention contemplates cement manufacture from this material.

The decomposition of limestone to lime and carbon dioxide:

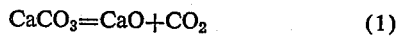  (1)

conversion of the dioxide to monoxide by carbon:

  (2)

as well as the reaction in the presence of hot carbon between lime and sulfur impurities:

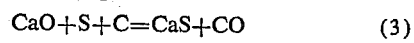  (3)

are all endothermic reactions which take place simultaneously. The rates of reaction become appreciable at 900° C. and quite rapid at 1000° C., the temperatures at which the iron oxide reduction is preferably conducted. The reduction reaction, on the other hand, is exothermic as indicated by the following equation:

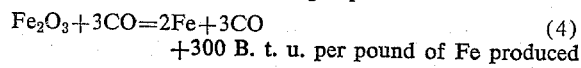  (4)

The heat liberated by Equation 4 is produced within the porous oxide pellets and serves to maintain the pellets at a temperature above that of the finely divided material and gases surrounding them.

In the drawings:

Fig. 1 is a flow diagram of the process of the present invention, illustrating a preferred arrangement of apparatus;

Fig. 2 is a schematic view of the rotating kiln reducing furnace of Fig. 1, together with its associated cooling zone, illustrating conditions within the kiln; and Fig. 3 is a schematic diagram of preferred apparatus in which the sponge metal pellets are separated from the powdered lime ash, and simultaneously cleaned.

Preparation of iron oxide

The iron oxide to be reduced may be in any well-known form, such as magnetite, its industrial counterpart rolling mill scale, or it may comprise iron oxide cinder resulting from the combustion of iron sulfide ores. Such cinder is presently available at low cost in large quantities, and despite its sulfur content, it may be economically used in carrying out the present invention. The oxide may or may not contain appreciable quantities of non-ferrous material, such as silica gangue, without unduly interfering with the process, except it should be understood that if sponge iron of exceptional purity is required, a highly pure oxide or ore such as Brazilian hematite should be used.

Since reduction of the oxide is effected by carbon monoxide and by diffusion and absorption of this gas into pieces of the oxide and of the gaseous products outward, the advantages of using as small pieces of oxide as practicable and of having these pieces as nearly as possible the same size are obvious. Thus, the iron oxide used is first finely divided, either in wet or dry condition, in a grinder 10, such as a ball mill, to a degree of fineness required for forming pellets, such fineness, however, not being particularly critical. It is preferable to add a binding material during grinding if the oxide is dry ground, or after grinding if it is done wet. Various binders may be used, with an organic material leaving no residue being preferred for use in preparing high grade sponge iron for iron powder, but cheaper inorganic binders are adequate for melting stock production. Generally speaking, the binding material may comprise ordinary wheat flour, molasses, sodium silicate, sulfite liquor, lime, caustic soda, or magnesia, any of which used in the order of 0.5 to 2 percent by weight of the ore will give a sufficiently hard pellet without adversely affecting the purity of the product. Where high purity of the iron product is required, a binder should be used which will yield as little as possible in the way of impurities upon heating.

The thus ground iron oxide and binder are then thoroughly mixed or blended as in a pug-mill 11 with about 10 percent by weight of water, or after de-watering to 10 percent moisture if the ore was wet ground. The blended material is then shaped or extruded as at 12, preferably in standard extrusion equipment such as that used in the clay industry, into small spherical or short cylindrical masses. The damp extrusions are then fed to a rotating drum indicated as pelletizer 13, which may be similar in construction to that of an ordinary rotating roasting kiln. The small shaped or extruded masses become rounded approximately into spheres by the rolling action as they pass through pelletizer 13, and they are dried and hardened through contact with hot gases entering the pelletizer at 14 flowing countercurrently to the bed of pellets therein, and being exhausted through stack 15 at the charging end of the pelletizer, to the atmosphere. Pelletizer 13 is rotated slowly so as to prevent breakage of the pellets being dried thereby avoiding the formation of iron oxide fines which cause sintering in the subsequent reduction operation. However, rotation is sufficient to permit substantially complete drying of the oxide masses to hard, porous pellets. The size of the pellets issuing from the pelletizer may be varied within wide limits, for example, from as small as $\frac{1}{16}$ inch to as large as $1''$ or $2''$ or more in diameter. Size of the pellets may be controlled by regulating the moisture content of the blend being shaped or extruded. For best results and rapid reduction later in the process, pellet diameters between about $\frac{1}{8}''$ and $\frac{3}{4}''$, e. g. $\frac{1}{2}''$, are preferred. In any case, the pellets should be sufficiently larger than the limestone and carbonaceous material which are mixed therewith later, so that the latter may serve as a fine interfering phase preventing agglomeration of pellets during reduction, and so that the reduced pellets may be cleanly separated from the lime, ash and carbon, if any, issuing from the reduction furnace.

While the thus formed iron oxide pellets are generally sufficiently hard to resist attrition in subsequent reducing and handling operations and may be reduced directly, I have found that roasting in some cases not only improves pellet hardness and removes sulfur but also substantially completely converts the oxide to $Fe_2O_3$ thus facilitating reduction to iron. Accordingly, I prefer to roast the pellets in air. They are conveyed, preferably pneumatically, to a moving bed or shaft roaster illustrated at 15. If the ore be magnetite, i. e., ferrous oxide, roasting may be effected without the addition of fuel to the roaster charge under proper conditions, since conversion of ferrous to ferric iron is accomplished by the generation of heat sufficient to bring the pellets to incipient fusion at a temperature in the neighborhood of 1500° C. The reaction is as follows:

$$4Fe_3O_4 + O_2 = 6Fe_2O_3 +$$ 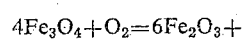
245 B. t. u. per pound of Fe content (5)

Roasting is carried out by blowing air through a column or bed of pellets in roaster 15 after the same have been ignited by an external source of heat. If the column or bed of pellets is kept in motion as by continuous feed and discharge, there will be no sticking. Cooling may be effected at the base of the roaster by incoming air. The roasted pellets will be substantially sulfur-free, gamma hematite, extremely hard, porous, somewhat vitreous yet completely permeable to the reducing gases. They completely resist abrasion in the presence of the finely divided limestone and carbonaceous material during the reduction process.

It will be obvious that if hematite or ferric oxide be the ore used it is not capable of further oxidation and the pellets thereof will not be self-roasting, but it has been found that if approximately 7 percent of its weight of the reduced metallic iron powder be added to this type of ore in the grinding operation, it will yield a mixture behaving for the process of this invention as if it were the ferrous or magnetic oxide and is then self-roasting. Alternatively, approximately one and one half percent by weight of carbon in the form of coke may be added during grinding of the hematite. This suffices to produce enough heat, during roasting, to bring the pellets to incipient fusion.

Either the dried pellets or dried and roasted pellets, if they have been prepared with a binder such as flour or molasses, free from such metallic bases as soda, lime or magnesia, will, upon reduction to iron, swell considerably, giving pellets of sponge iron twice as large or larger than the original oxide pellet and though this is advantageous for some uses, as when a very fine, light, porous iron powder is required, it is undesirable for other uses where larger particle size and higher density is required. This swelling may be entirely prevented by using one half of one percent by weight of the ore, either of soda, lime or magnesia as a binding agent in the pelleting operation, with or without the use of organic binders. These bases are found to combine with the iron oxide in the high temperature self-roasting operation with the result, that, in later reduction the pellets do not swell and may be comminuted to give a dense metallic powder of large particle size, due no doubt to the bonds effected by the fused base addition.

The reducing agent

While the compound relied upon to actually reduce the iron oxide pellets to iron is carbon monoxide, the mixture relied upon to initially produce this gas is termed the "reducing agent" herein. It comprises a finely divided mixture of limestone and solid carbonaceous material. In former processes for the reduction of the oxide to sponge iron carbon has been employed as the primary source of carbon monoxide, with the carbon being oxidized only to the monoxide in an oxygen deficient atmosphere as follows:

$$2C + O_2 = 2CO \qquad (6)$$

with reduction of ferric oxide proceeding in accordance with Equation 4. It will be observed that for each mole of $Fe_2O_3$ reduced, three moles of CO are required, which require, according to Equation 6, three moles of C, neglecting of course additional carbon required to reduce the $CO_2$ produced in the ore reduction. Accordingly, a process requiring less carbon such as that of the present invention would be economically attractive.

Drawing attention to Equation 2, it will be seen that two moles of CO may be produced from but one mole of C when the material being reduced is $CO_2$. Thus instead of three moles of carbon, only one and one-half moles are required to effect the reduction of Equation 4. The economic saving is not one-half as may be supposed, since the heat liberated by combustion of carbon to carbon monoxide and required to raise the temperature of the ore must now be supplied in part from another source. This source is desirably fuel oil, natural or coke oven gas which are considerably cheaper in most localities than carbon in the form of high grade coke which is employed for the most part today.

The carbonaceous material employed in the present process is desirably coke or anthracite. However, the coke may be a low grade material, for example, high in sulfur content such as that produced from Nova Scotia bituminous coal which contains about 3 percent sulfur originally. Sulfur introduced from the coke or anthracite during reduction is substantially completely scavenged in accordance with Equation 3 and does not appear in the iron product. In view of the high concentration of limestone and lime with respect to ash present during reduction, fusion of the ash of the carbonaceous material is no longer a limiting factor. The fusion temperature of the ash of the above Nova Scotia bituminous is only about 1050–1100° C., temperatures which, although not necessary, might easily be reached during reduction in accordance with the present invention. However, due to the presence of limestone and lime the fusion point of the ash is raised approximately 200° C.

Although coke and anthracite are preferred, the process has been carried out successfully with the raw Nova Scotia bituminous, and the present invention contemplates the use of uncoked soft coal. When such a material is employed, the volatiles therein, usually constituting about one-third by weight of the coal, are burned in the reducing zone thereby providing heat for the reduction and greatly reducing gas or fuel oil requirements. However, coking of the coal within the reducing zone must be avoided since the fine particles tend to agglomerate and stick to the pellets. This necessitates critical temperature control within the reducing furnace. Thus, while bituminous coal may be employed, anthracite or coke are preferred, with coke being the more reactive. In present operation of the process, the low grade soft coal is utilized on a coking stoker from which the volatiles are used to replace oil in providing the heat required in the reducing furnace, and the coke therefrom is employed in the reducing agent.

The limestone is conveniently a low grade shaly stone containing about 80 percent $CaCO_3$, preferably of cement making composition which may be used for cement production after its use in the reduction. In some instances the magnesia, alumina and silica present in coal or coke ash will supplement these metal oxides in the limestone to the proper degree, in which case the finely divided material separated from the iron pellets at the end of the process may be calcined directly to cement. For example, a composition known to be entirely satisfactory when applied to a wide variety of cementitious raw materials is:

$$CaCO_3 \text{ required} = 4.1 SiO_2 + 2.6 R_2O_3 \qquad (7)$$

by weight, where $R_2O_3$ refers to iron, magnesium, aluminum and other metal oxides. Preferably, however, the composition of the lime and unreduced metal oxide powder separated from the pellets will be adjusted in accordance with the above general formula and then calcined to cement. Thus while virtually any limestone will suffice as a component of the reducing agent mixture, a shaly cement-forming stone is preferred since obvious economic advantages accrue where the powder is calcined to cement.

During reduction the limestone not only serves as a source of carbon dioxide and makes possible the effective absorption of sulfur from the coke and prevents its entry into the iron pellets, but it also raises the fusion point of the coke ash as noted earlier. Furthermore, the limestone and lime produced therefrom acts as an infusible interfering phase between the pellets thereby preventing the metallized pellets from sintering together.

Preparation of the reducing agent

The limestone and coke or coal as the case may be are dry ground together in the proper proportions as in an air-swept ball mill 16. The degree of fineness of grinding is dictated primarily by the size of the oxide pellets to be reduced. Generally grinding is through 30 to 100 mesh screen. With ½" pellets, the reducing agent is desirably ground to pass 60 mesh. After grinding the material is stored in a bin 17.

The proportions of limestone to coke or coal in the reducing agent are determined primarily by Equations 1 to 4, but also by the concentration of carbon monoxide desired within the reducing furnace. While the limestone may vary within wide limits, large excesses are to be avoided since additional heat is required to decompose the excess stone. As a general proposition, sufficient limestone is provided so that an adequate interfering phase exists within the furnace, sufficient $CO_2$ is provided, sulfur is substantially completely absorbed from the coke, and the fusion point of the coke ash is adequately raised. Sufficient carbon is always present to react completely with the $CaCO_3$ decomposition product $CO_2$ to convert the same to CO, and also to react completely with the $CO_2$ produced in the $Fe_2O_3$ reduction. An excess of carbon over these requirements is preferably provided. Because of the different ores to be reduced, differences in $CaCO_3$ content of the various limestones, as well as the fixed carbon content of the coke or coal being employed, it is difficult to lay down a weight ratio of limestone to coke for example which will perform properly in all cases. By way of illustration, a reducing agent containing about 1 to 1½ parts by weight carbon per part by weight $CaCO_3$ performs well in the present process to reduce ore containing about 70 percent $Fe_2O_3$. With bituminous coal, however, substantially more $CaCO_3$ is required to help prevent coking. It is sufficient to say that at least enough carbon is provided to completely convert $CO_2$ produced in the process to CO.

The furnace charge

The roasted pellets and finely divided reducing agent are mixed in a hopper 18 from which the mixture is charged to the reducing furnace as by a screw conveyor 19.

The furnace charge may be varied within wide limits according to the type of ore used. By way of example, when pure oxide pellets are being reduced the preferred charge input per 100 parts of pellets (70 percent Fe) by weight is: 60 to 80 parts reducing agent containing about 60 percent coke (85 percent fixed C) and 40 percent limestone (80 percent $CaCO_3$).

This charge has proved eminently satisfactory in the process of the present invention, as has a charge employing a reducing agent containing substantially equal weights of coke and limestone. While carbon is preferably present in excess as indicated earlier, a tentative practical lower limit for carbon as coke may be expressed: Coke about 30 percent of the weight of the pellets (70 percent Fe) plus about 10 percent of the weight of the limestone.

The reduction operation

Conversion of the pellets to metallic iron is carried out in a reduction furnace and preferably in an inclined rotary kiln 20 which is insulated and lined with fire brick. It is operated at about 1 R. P. M. so as to provide a gently agitated bed of material therein. The kiln has an open central circular charging part through which the charge is fed from conveyor 19, simultaneously with a controlled amount of air and an oil-air or gas-air mixture, which is ignited at burner 21. An induced draft flowing co-currently with the charge is created by exhaust fan 22. This co-current flow within the reducing zone is the reverse of blast furnace and many previous operations for direct iron.

Referring to Fig. 2, it will be seen that enough air is introduced at the charging end of the furnace to create an atmosphere above the charge which is fully oxidizing thereby to completely burn the fuel oil or gas. There is thus a high release of heat at the charging end where it is most required, that is against the cold, unreduced charge, which rapidly absorbs heat and is not subject to sintering or sticking. As the charge reaches about 900° C., the limestone in intimate contact with the pellets decomposes forming carbon dioxide which is immediately reduced to carbon monoxide within the charge which permeates the pellets reducing them to iron. The reaction rates increase due to the liberation of heat by the oxide reduction and become very rapid at 1000° C. Success of the present process is due primarily to the complete reducing condition produced within the charge. As indicated in Fig. 2, the atmosphere surrounding the pellets is substantially 100 percent carbon monoxide.

Large quantities of carbon dioxide liberated within the charge during the iron oxide reduction are also converted to carbon monoxide through contact with hot carbon. In fact, carbon monoxide is evolved from the charge and is present in sufficient excess in the atmosphere above the bed of material in the kiln that large quantities of the same are burned in the furnace without danger, since conditions within the charge are fully reducing and there is an outward flow of gas from the charge. However, air introduced at the charging end is controlled so that the atmosphere above the charge throughout a major portion of the length of the furnace is reducing with respect to iron at 1000°–1050° C. Generally, the ratio of $CO:CO_2$ above the charge should not be allowed to fall below 2:1. As a practical matter it is only necessary to ensure that the discharge gases entering hood 23 create a short flame therein upon contact with air induced into the hood around the upper portion of the conical discharge end of kiln 20. The hot gases from the hood are preferably employed in the pelletizing operation as indicated in Fig. 1.

Temperature within the kiln is observed by means of a pyrometer 24 near the discharge end. If the pellets show incipient fusion of the metal, the temperature is too high, and it may be lowered by restricting air introduced at the charging end or by reducing the flame at burner 21. Conversely, if the pellets are not sufficiently reduced, the temperature is too low and may be corrected accordingly. The present process is carried out at bed temperatures ranging from about 900° C. to a maximum of about 1050° C. within the kiln. Bed temperature is desirably maintained safely below the maximum, and is preferably about 900° C.–1000° C.

The iron pellets and finely divided lime and ash issuing from the conical discharge end of kiln 20 are next cooled, preferably in a water jacketed conveyor, illustrated as a screw conveyor 25. A minor portion of the reducing atmosphere from the kiln is directed to conveyor 25 through line 26 and induced through the conveyor by a small blower 27. There is thus provided a non-oxidizing atmosphere around the metal pellets during cooling, so that the surface of the pellets is not oxidized.

Product separation

The iron pellets and spent reducing agent powder are collected in a hopper 28 at the discharge end of the cooling conveyor. This material may be conveyed to suitable screening or magnetic separating apparatus to free the pellets of lime, ash and any unreacted carbon. However, I have found that the metal pellets can be more efficiently and completely separated from the spent reducing agent powder and the surface of the pellets can at the same time be cleaned by a novel air classifying process.

In accordance with this separation process, the pellets and powder are conveyed pneumatically from hopper 28 to a first or pellet separator 31 in the form of an inverted cone, resembling an ordinary cyclone. Material enters the pellet separator 31 tangentially at reasonably high speed induced by the suction of blower 32 and whirls around as indicated in Fig. 3, with the pellets settling to the base of the separator cone and discharging into storage bin 33. A strong updraft of air is provided within the pellet separator as well as at the pellet discharge end thereof by an air intake port 34 located in the upper portion of storage bin 33. By reason of the updraft, the powder is prevented from entering the storage bin, travelling instead centrally upward in separator 31 as indicated by the arrow in Fig. 3 and outwardly thereof through overhead exhaust line 35. Through whirling action and contact with the more rapidly travelling particles of powder, the metal pellets are effectively cleaned in the separator 31. They are then ground or melted as their use dictates.

The pellets of substantially pure iron are more or less spongy according to the treatment given them before reduction. Pellets which have been made from pure ferric oxide and flour binder and simply dried yield a very spongy product which disintegrates to an exceedingly fine powder suitable for magnetic core production. On the other hand, pellets which have been prepared with one-half percent by weight of alkaline or alkaline earth base and roasted above 1100° C. yield on reduction a less spongy pellet which disintegrates to a relatively coarse powder more suitable for the fabrication of mechanical parts. All types of pellets may be simply melted, or pressed and then melted if solid metal is required.

Exhaust line 35 of separator 31 is connected to a second or powder separator 36, which may be a conventional cyclone separator. In this apparatus, the powder is effectively collected and drops into storage bin 37, there being no induced updraft between storage bin and separator.

The powder thus collected comprises burnt shaly lime together with calcium sulfide, some unused carbon and oxides other than calcium present in the limestone. As indicated above the composition may be suitable without modification as a cement formulation. However, it is more likely that slight adjustments of the metal oxide content of the powder will be necessary prior to conversion to cement. Calcination and clinkering of this residue to form cement is carried out in a conventional manner requiring temperatures over 300° C. higher than those encountered in the reduction operation. This heat is conveniently provided by the volatile gases from a coking operation conducted to provide the preferred carbonaceous material for carrying out the present invention.

The total raw materials used in the present invention will vary with the type of ore being reduced, and the process has been applied to a wide variety of ores ranging from high grade concentrates to pyrite cinder and blast furnace types. When operating for the production of high grade powder from concentrates rating about 70 percent Fe, for each ton of metal pellets produced I have employed 1.43 tons of pellets one-half inch in diameter, 0.6 ton of soft coke fines, 0.6 ton of shale limestone (both coke and stone through 60 mesh), and about 0.4 ton of fuel oil. Reduction was complete in two hours at 1000° C., approximately one-four the time required in a blast furnace. The pellets had the following analysis:

| | Percent |
|---|---|
| Carbon | 0.02 |
| Sulfur | 0.01 |
| Phosphorus | Nil. |
| Silica | 0.40 |
| $Fe_3O_4$ | 1.50 |
| Metallic iron | 98.07 |
| | 100.00 |

The present invention has been described employing a rotary kiln as the reduction furnace, and this is the preferred apparatus for carrying out the process. However, the stationary tunnel type with continuous moving conveyor or vibratory hearth, as well as the well known Herreshoff superimposed multiple hearth furnace may also be employed with good results.

What is claimed and desired to be secured by Letters Patent is:

1. A continuous process for the reduction of iron oxide to iron in spongemetal form which comprises forming ore comprising iron oxide into substantially round pellets, heating said pellets under oxidizing conditions until the same are substantially fully oxidized, whereby sulfur is removed therefrom and said pellets are changed into a hard, porous crystalline state, mixing therewith a reducing agent in finely divided form comprising limestone and a solid carbonaceous material capable of reducing carbon dioxide to carbon monoxide, said limestone and its solid decomposition product serving as an interfering phase between said pellets during reduction, the quantity of carbonaceous material in said reducing agent being at least sufficient to reduce all of the carbon dioxide liberated by decomposition of said limestone as well as that evolved in the iron oxide reduction to carbon monoxide, providing a reducing zone, charging said mixture of iron oxide pellets and reducing agent to said zone and providing a bed of said mixture therein, directly heating said mixture within said zone with an oxidizing condition at its charging end to a temperature sufficient to decompose said limestone to lime and carbon dioxide, whereby at said temperature said carbon dioxide is reduced within the bed by the also hot carbonaceous material to carbon monoxide which permeates said pellets reducing the same to iron with the evolution of carbon dioxide which is likewise reduced by said hot carbonaceous material, the atmosphere above the bed being non-oxidizing with respect to iron at the temperature within the furnace over the remaining length of the furnace, advancing said bed and atmosphere co-currently through said reducing zone to the discharge end thereof, and allowing said oxide reduction to continue to substantial completion therein, conducting the resulting iron pellets and spent reducing agent issuing from said reducing zone to a cooling zone, and separating the iron pellets from the finely divided spent reducing agent after discharge from said cooling zone.

2. Process in accordance with claim 1, wherein the solid carbonaceous material is selected from the group consisting of coke, anthracite, and bituminous coal.

3. Process for the reduction of iron oxide to sponge iron which comprises forming ore comprising iron oxide into substantially round pellets, heating said pellets under oxidizing conditions until the same are substantially fully oxidized, whereby sulfur is removed therefrom and said pellets are changed into a hard, porous crystalline state, mixing therewith a reducing agent in finely divided form comprising limestone and a solid carbonaceous material capable of reducing carbon dioxide to carbon monoxide, the limestone in said reducing agent and its decomposition product serving as an infusible interfering phase between pellets thereby preventing their sintering together, said carbonaceous material containing at least sufficient fixed carbon to reduce all of the carbon dioxide produced by decomposition of the limestone as well as that evolved in the iron oxide reduction to carbon monoxide, providing a rotating kiln, charging said mixture of iron oxide pellets and reducing agent to said kiln and providing a bed of said mixture therein, heating said mixture within said zone and under oxidizing conditions adjacent said charging end to at least about 900° C., whereby decomposition of said limestone to lime and carbon dioxide within said bed is initiated as well as reduction of the latter by the also hot carbonaceous material to carbon monoxide which permeates said oxide pellets reducing the same to iron with the evolution of carbon dioxide which is in part reduced to carbon monoxide within and in contact with the said bed, the atmosphere above said bed over substantially the remaining length thereof, being non-oxidizing with respect to iron at bed temperature and increasingly so toward the discharge end of the furnace, maintaining the temperature of said bed between about 900° C. and about 1050° C., advancing said bed and said atmosphere co-currently through said reducing zone to the discharge end thereof and allowing iron oxide reduction to continue to substantial completion, conducting the resulting iron pellets and spent reducing agent discharged from said reducing zone to a cooling zone, maintaining an atmosphere within said cooling zone which is non-oxidizing to the iron pellets introduced thereto, and after cooling, separating the iron pellets from the finely divided spent reducing agent.

4. Process according to claim 3, wherein the non-oxidizing atmosphere within the cooling zone is a minor portion of the non-oxidizing atmosphere from the reducing zone.

5. A continuous process for the reduction of iron oxide to sponge iron which comprises forming ore comprising iron oxide into substantially round pellets, heating said pellets under oxidizing conditions until the same are substantially fully oxidized, whereby sulfur is removed therefrom and said pellets are changed into a hard, porous crystalline state, mixing therewith a reducing agent in finely divided form comprising limestone and a solid carbonaceous material capable of reducing carbon dioxide to carbon monoxide, said limestone and carbonaceous material and their solid decomposition products serving as an interfering phase between pellets, thereby preventing sintering together of the pellets in the process, the fixed carbon of said carbonaceous material present in the mixture of pellets and reducing agent being at least sufficient to reduce carbon dioxide produced by decomposition of said limestone and by reduction of said iron oxide to carbon monoxide, providing a rotating kiln, continuously charging said mixture of iron oxide pellets and reducing agent thereto and providing a gently agitated bed of the mixture therein, introducing a quantity of air at said charging end thereby providing an oxidizing atmosphere at the charging end of said zone, heating said mixture adjacent said charging end to at least about 900° C., whereby decomposition of said limestone to lime and carbon dioxide within said bed is initiated as well as reduction of the latter by the also hot carbonaceous material to carbon monoxide which permeates said oxide pellets reducing the same to iron with the evolution of carbon dioxide which is in part reduced to carbon monoxide within and in contact with said bed, and whereby carbon monoxide is evolved from said bed, allowing a portion of said evolved carbon monoxide to burn to carbon dioxide above the bed while maintaining the atmosphere within said zone above the bed non-oxidizing with respect to the hot iron being produced from a point adjacent the charging end to the discharge end of said reducing zone, advancing said bed and non-oxidizing atmosphere co-currently through said zone at a bed temperature between about 900° C. and about 1050° C. and allowing iron oxide reduction to continue to substantial completion, continuously discharging from said reducing zone the resulting iron pellets and spent reducing agent to a cooling zone maintaining an atmosphere within said cooling zone which is non-oxidizing to said iron pellets introduced thereto, and separating the iron pellets from the finely divided spent reducing agent after discharge from said cooling zone.

6. Process according to claim 5, wherein the ratio of $CO:CO_2$ at the atmosphere above the bed in the reducing zone is maintained above about 2:1.

7. Process according to claim 5, wherein the solid carbonaceous material is anthracite coal.

8. Process according to claim 5, wherein the solid carbonaceous material is coke.

9. Process according to claim 5, wherein the fixed carbon in said reducing agent is at least equal to the weight of calcium carbonate therein.

10. Process according to claim 5, wherein the iron oxide pellets comprise hematite and the mixture charged to the reducing zone comprises 100 parts by weight of said pellets and between about 60 and about 80 parts by weight of reducing agent comprising carbon and calcium carbonate in the weight ratio of about 1 to 1½ parts carbon per part calcium carbonate.

11. Process according to claim 5, wherein the limestone of said reducing agent is a limestone of cement making characteristics, and including the additional steps of adjusting the composition of said finely divided spent reducing agent separated from said iron pellets to a cement formulation, and continuously calcining the thus modified material to cement.

References Cited in the file of this patent

UNITED STATES PATENTS

| | | |
|---|---|---|
| 1,517,597 | Stebbins | Dec. 2, 1924 |
| 1,558,262 | Greenwood | Oct. 20, 1925 |
| 1,786,999 | Hornsey | Dec. 30, 1930 |
| 1,848,710 | Gustafsson | Mar. 8, 1932 |
| 1,897,881 | Basset | Feb. 14, 1933 |
| 1,937,822 | Jones | Dec. 5, 1933 |
| 2,080,028 | Avery | May 11, 1937 |
| 2,132,149 | Edwin | Oct. 4, 1938 |
| 2,511,400 | De Jahn | June 13, 1950 |
| 2,674,445 | Diehl | Apr. 6, 1954 |

FOREIGN PATENTS

| | | |
|---|---|---|
| 290,318 | Great Britain | May 7, 1928 |

OTHER REFERENCES

Proceedings of Blast Furnace and Raw Materials, volume 4, 1944, pages 58–59; A. I. M. E., 29 West 39th St., New York.

UNITED STATES PATENT OFFICE
CERTIFICATE OF CORRECTION

Patent No. 2,855,290                      October 7, 1958

Horace Freeman

It is hereby certified that error appears in the printed specification of the above numbered patent requiring correction and that the said Letters Patent should read as corrected below.

Column 11, line 20, for "at the atmosphere" read -- in the atmosphere --.

Signed and sealed this 30th day of December 1958.

(SEAL)
Attest:

KARL H. AXLINE                      ROBERT C. WATSON
Attesting Officer                      Commissioner of Patents